United States Patent Office 3,368,406
Patented Feb. 13, 1968

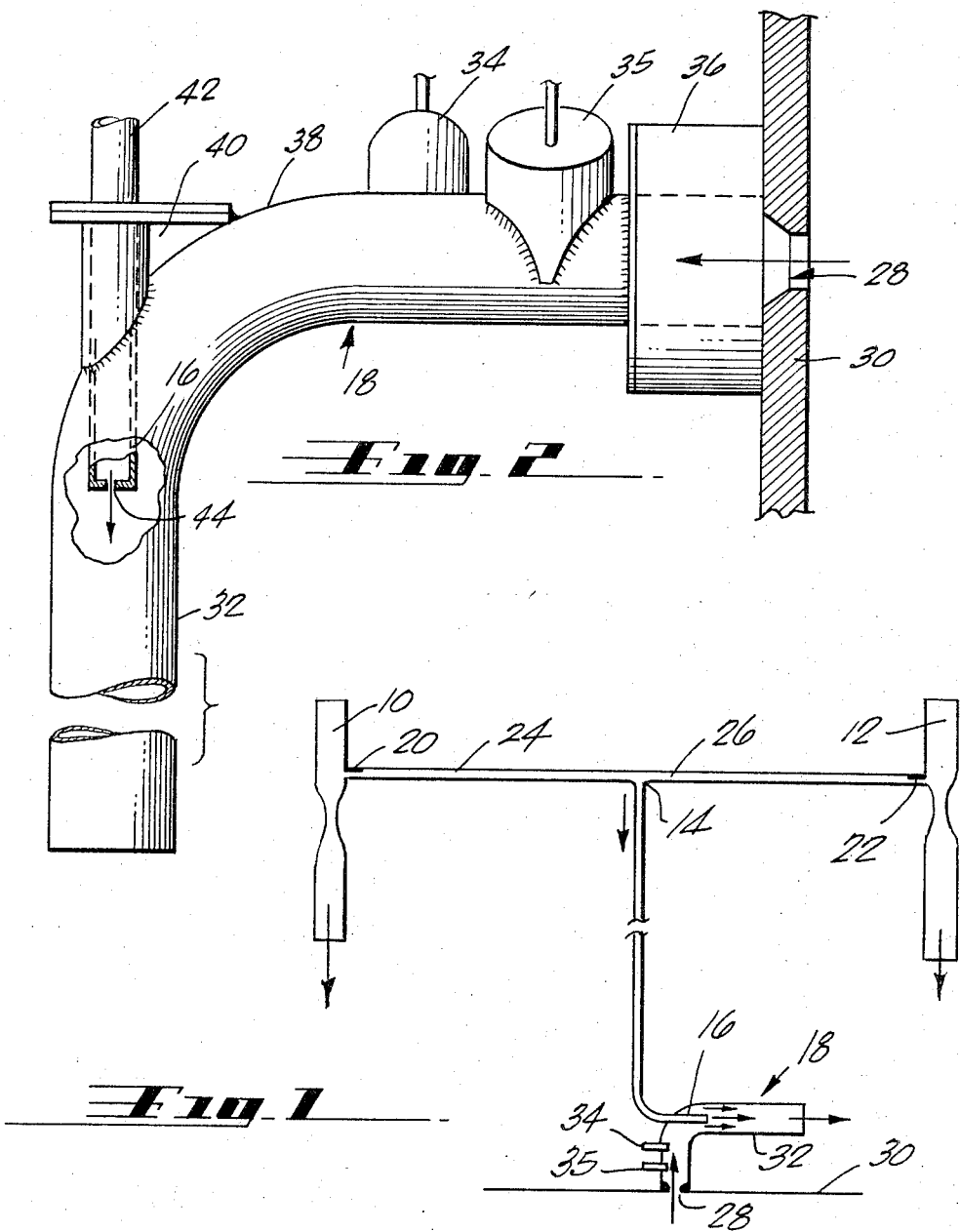

3,368,406
TEMPERATURE SENSOR AIR AUGMENTER
Willard D. Himebaugh, Westminster, Calif., assignor, by mesne assignments, to McDonnell Douglas Corporation, Santa Monica, Calif., a corporation of Maryland
Filed Feb. 2, 1966, Ser. No. 524,437
3 Claims. (Cl. 73—349)

ABSTRACT OF THE DISCLOSURE

A temperature sensor air augmenter system for providing an adequate airflow over cabin temperature sensors for cabin temperature indication and control. A jet pump draws cabin air through a small opening in the cabin and past temperature sensors in the airpath conductor mounted over the opening. The jet stream for this pump comes from the air-conditioning systems of the aircraft.

---

Temperature sensors are well known for initiating the actuation of heating or cooling devices in response to the temperature in the area controlled thereby. However, these sensors merely sense the temperature at the immediate location of the sensor unless air is continually circulated, in which case the sensor senses temperature in the area subject to its control. In closed areas such as in cabins of aircraft, for example, if excess airflow is provided, tobacco tars and lint accumulate about the sensor and it requires frequent cleaning. If there is too little airflow over the sensor, the sensor's self-heat causes temperature error. A temperature sensor protruding into the cabin is unsightly, and if it is flush mounted, the sensor does not sense cabin temperature that is felt by the passengers, but instead senses the cabin interior wall boundary layer, i.e., the non-circulating air. Such installations cause sluggish and inaccurate control of cabin temperature. If fans are used to circulate the air, they usually make noise and when they fail the temperature control becomes inaccurate. When a venturi is used to blow cabin air past the sensor and overboard, it becomes ineffective on the ground or at low cabin pressure differential. Moreover, it adds to the cabin leakage, which is a problem on all aircraft. The combination of a fan and a venturi has been used with the fan on the ground and the venturi in flight. This combination increases the life of the fan and provides airflow over the sensor on the ground. However, this has a disadvantage in that it is complex, heavy, and still contributes to cabin leakage. When the cabin exhaust air is sensed there is an excessive lag in sensing the actual cabin temperature.

The temperature sensor air augmenter system illustrative of the present invention samples cabin air drawn over the temperature sensors in a manner to reflect more accurately the cabin temperature at any given time. The system has no protrusions into the cabin, provides extremely accurate readings of cabin temperature, obtains a highly responsive temperature control due to minimization of cabin lag, permits the use of lower gain amplifiers for control, and minimizes tar collection. A relatively constant airflow is provided over the sensors automatically whenever the air-conditioning system is operating. No complexity of apparatus is required to provide automatic features. Airflow over the sensors can be easily changed virtually without affecting other systems' performance. Cabin leakage is not affected. Because of the elimination of self-heat effects in the sensors, a wider flexibility in sensor and controller amplifier selection is possible.

In accordance with the present invention a small opening is provided in the cabin, through which the cabin air is drawn by means of a jet pump. Temperature sensing devices are mounted on an airpath conductor mounted over this opening. Rearwardly of these sensors a small tube protrudes to provide the jet stream for the pump. This tube is connected to the air-conditioning systems of the aircraft and as air is passed from the tube rearwardly of the conductor, it also drawns cabin air through the cabin opening and past the temperature sensors in the airpath conductor.

It is therefore an object of this invention to provide for an improved temperature sensor air augmenter system.

Another object is the provision of a temperature sensor air augmenter system which more accurately and reliably senses temperature with the least weight, maintenance, and space requirements.

Another object is the provision of a system for drawing air over a temperature sensor to sample more accurately the temperature in an area to be controlled thereby.

Other objects will become more apparent as a description of the invention proceeds, having reference to the drawings, wherein:

FIGURE 1 is a schematic illustration of the system, and

FIGURE 2 is a perspective view of the augmenter unit.

For safety purposes, there are two air-conditioning systems in transport aircraft. Each of these conduct air under pressure as illustrated by conductors 10, 12 in FIG. 1. A T-coupling 14 is connected to both conductors to feed air under constant pressure to the primary tube 16 of the small ejector or jet pump 18. Either orifices or one-way valves 20, 22 are positioned between the conductors 10, 12 and the tubes 24, 26 of the T-joint 14. These restrictions maintain sufficient pressure at the primary tube 16 if either of the two pressure sources in conductors 10 or 12 is shut off. In other words, air will flow over the sensors if either one of the refrigerating airflows in conductors 10 or 12 is shut off.

An aperture 28 is provided in cabin wall, ceiling or other structure 30, such as a hatrack behind which is mounted the secondary tube 32 of jet pump 18. Opening 28 is chamfered to prevent noise. Within tube 32 is mounted temperature sensing devices 34 and 35 where it is in contact with the airflow from within the cabin. Sensor 35 is used for cabin temperature control. Sensor 34 is used for remote cabin temperature indication. The air from tube 32 may be re-circulated or pumped overboard as desired.

Reference is now made to the temperature sensor air augmenter device shown in FIGURE 2. Here there is shown a portion of the cabin interior structure 30 having a chamfered hole 28 therein. Opening 28 preferably is from .2 to .4 inch in diameter. Jet pump 18 with a soft rubber cushion 36 on the end of the secondary tube 32 is positioned behind opening 28 to permit the passage of cabin air therethrough. Cushion 36 permits the removal of ceiling panel 30 without disturbing the installation. Rearwardly of elbow 38 of tube 32 is a mounting bracket 40 into which primary tube 42 is positioned. Primary tube 42 preferably is approximately $5/16$ inch, more or less, in diameter and has an orifices 44 of approximately .020 inch in diameter when the pressure in conductors 10 or 12 is approximately 18 to 23 p.s.i.g. If the pressure in 10 or 12 is higher or lower the orifice 44 would be smaller or larger as required for the same air flow. Tube 42 receives primary air under regulated pressure from the air-conditioning system, as pointed out in connection with FIGURE 1, and causes a primary airflow whenever the air-conditioning system is on.

This flow of primary air causes a flow of the secondary or cabin air over the temperature sensors 34. The primary airflow is so low that the air temperature is equal to cabin temperature when the air reaches the jet pump 18. Since the primary air is pressure regulated and choked, the secondary flow is a function of the absolute pressure in 10 or 12 and the cabin pressure. This results in a nearly constant primary flow and secondary flow. The jet pump 18 may be made as small as the physical size of the temperature sensors 34 and 35 will permit.

As can be seen, this augmenter system is of minimum weight, has no moving parts and is completely automatic with no circuitry required other than that of sensing the temperature. The system works at all times, in flight and on the ground, when the air-conditioner system is on to provide pressure for the primary tube 42. Because of the low velocity of air movement pass the sensors provided by this system, sensitivity is provided without requiring filtering of the air in the system.

While the foregoing description of the various embodiments is for purposes of illustration only, and is not intended to limit the scope of the invention, it is to be understood that other modifications and variations in structure are contemplated and are within the purview of those skilled in the art. It is to be understood that the scope of this invention is to be determined by a reasonable interpretation of the appended claims.

What is claimed is:

1. An air augmenter system for sensing temperature within a contained area, said system comprising:
    a temperature sensor,
    a jet pump for drawing air from said contained area over said sensor,
    said jet pump including a secondary tube, said secondary tube being positioned over an opening communicating with said area,
    a primary tube terminating within said secondary tube,
    said primary tube being connected to a pressurized air source whereby pressurized air passing out said primary tube into said secondary tube causes air to be drawn through said opening, pass through said secondary tube and over said sensors, said pressurized air source including a plurality of independently operable air-conditioning systems separately and collectively supplying airflow through said primary tube.

2. An air augmenter system as in claim 1 wherein the area is an aircraft cabin, the opening in said cabin is chamfered and is of a size within the range of from .2 to .4 inch diameter and wherein said primary tube within said secondary tube is connected to a pressurized air source within the air-conditioning system of said aircraft, and wherein said primary tube is approximately 5/16 inch diameter and has an opening within said secondary tube of approximately .020 inch diameter at gauge pressure of 18–23 p.s.i.g.

3. An air augmenter system as in claim 1 wherein a pair of air-conditioning systems are interconnected together with airflow paths and with said primary tube through a T-joint,
    said airflow paths having restrictions therein on either side of said T-joint whereby said primary tube has airflow therein when only one of said systems is operating.

References Cited
UNITED STATES PATENTS

| | | | |
|---|---|---|---|
| 2,627,182 | 2/1953 | Quereau et al. | 73—351 |
| 3,167,960 | 2/1965 | Miesiak | 73—343 |
| 3,285,787 | 11/1966 | Ehrler | 73—349 |

LOUIS R. PRINCE, *Primary Examiner.*

N. B. SIEGEL, *Assistant Examiner.*